United States Patent [19]
Watanabe et al.

[11] Patent Number: 6,122,311
[45] Date of Patent: Sep. 19, 2000

[54] DEMODULATING METHOD AND APPARATUS, RECEIVING METHOD AND APPARATUS AND COMMUNICATION APPARATUS

[75] Inventors: Nobuhiko Watanabe, Kanagawa; Jun Iwasaki, Tokyo, both of Japan

[73] Assignee: Sony Corporation, Tokyo, Japan

[21] Appl. No.: 09/007,187

[22] Filed: Jan. 15, 1998

[30] Foreign Application Priority Data

Jan. 21, 1997 [JP] Japan .................................. 9-008921

[51] Int. Cl.[7] .................................................... H04J 13/04

[52] U.S. Cl. ............................ 375/147; 375/141; 370/342

[58] Field of Search .................................... 375/130, 147, 375/150, 347, 140, 141, 145, 149; 370/320, 335, 342

[56] References Cited

U.S. PATENT DOCUMENTS

| | | | |
|---|---|---|---|
| 5,508,708 | 4/1996 | Ghosh et al. | 324/457 |
| 5,627,835 | 5/1997 | Witter | 370/320 |
| 5,764,687 | 6/1998 | Easton | 375/206 |
| 5,818,887 | 10/1998 | Sexton et al. | 375/355 |
| 5,889,815 | 3/1999 | Iwakiri | 375/208 |
| 5,945,948 | 8/1999 | Buford et al. | 342/457 |
| 5,950,131 | 9/1999 | Vilmur | 455/434 |
| 5,956,367 | 9/1999 | Koo et al. | 375/206 |

*Primary Examiner*—Young T. Tse
*Attorney, Agent, or Firm*—Jay H. Maioli

[57] ABSTRACT

When demodulated signals through respective paths are combined by a data combiner, with write addresses of count values of PN phase counters that represent the phases of the PN codes of fingers, the demodulated signals that are output from the fingers are stored in memories. With a common read and combined to form a single demodulated signal address, signals stored in the memories are read.

14 Claims, 7 Drawing Sheets

DEMODULATING METHOD AND APPARATUS, RECEIVING METHOD AND APPARATUS AND COMMUNICATION APPARATUS

BACKGROUND OF THE INVENTION

1. Field of the Invention

The present invention relates to a receiving apparatus suitable for a CDMA (Code Division Multiple Access) type cellular telephone system, a receiving method thereof, and a terminal unit for use with a radio system thereof.

2. Description of the Related Art

In recent years, a CDMA type cellular telephone system has become attractive. In the CDMA type cellular telephone system, a pseudo-random code is used as a spread code. A carrier of a transmission signal is spectrum-spread. The pattern and phase of each spread code in the code sequence are varied so as to perform a multiple access.

In the CDMA system, the spectrum spread method is used. In the spectrum spread system, when data is transmitted, the carrier is primarily modulated with the transmission data. In addition, the carrier that has been primarily modulated is multiplied by a PN (Pseudorandom Noise) code. Thus, the carrier is modulated with the PN code. As an example of the primarily modulating method, balanced QPSK modulating method is used. Since the PN code is a random code, when the carrier is modulated by the PN code, the frequency spectrum is widened.

When data is received, the received data is multiplied by the same PN code that has been modulated on the transmission side. When the same PN code is multiplied and the phase is matched, the received data is de-spread and thereby primarily modulated data is obtained. When the primarily modulated data is demodulated, the original data is obtained.

In the spectrum spread method, to de-spread the received signal, the same PN code that has been modulated on the transmission side is required for both the pattern and the phase. Thus, when the pattern and the phase of the PN code are varied, the multiple access can be performed. The method for varying the pattern and the phase of each spread code in the code sequence and thereby performing the multiple access is referred to as CDMA method.

As cellular telephone systems, an FDMA (Frequency Division Multiple Access) system and a TDMA (Time Division Multiple Access) system have been used. However, the FDMA system and the TDMA system cannot deal with a drastic increase of the number of users.

In other words, in the FDMA system, the multiple access is performed on different frequency channels. In an analog cellular telephone system, the EDMA system is usually used.

However, in the FDMA system, since the frequency use efficiency is bad, a drastic increase of the number of users tends to cause channels to run short. When the intervals of channels are narrowed for the increase of the number of channels, the adjacent channels adversely interfere with each other and thereby the sound quality deteriorates.

In the TDMA system, the transmission data is compressed on the time base. Thus, the use time is divided and thereby the same frequency is shared. The TDMA system has been widely used as a digital cellular telephone system. In the TDMA system, the frequency use efficiency is improved in comparison with the simple FDMA system. However, in the TDMA system, the number of channels is restricted. Thus, it seems that as the number of users drastically increases, the number of channels runs short.

On the other hand, the frequency use efficiency improves and more channels can be obtained.

In the FDMA system and the TDMA system, signals tend to be affected by fading due to multipaths.

In other words, as shown in FIG. 1, a signal is sent from a base station 201 to a portable terminal unit 202 through a plurality of paths. In addition to a path P1 in which a radio wave of the base station 201 is directly sent to the portable terminal unit 202, there are a path P2, a path P3, and so forth. In the path P2, the radio wave of the base station 201 is reflected by a building 203A and sent to the portable terminal unit 202. In the path 23, the radio wave of the base station 201 is reflected by a building 203B and sent to the portable terminal unit 202.

The radio waves that are reflected by the buildings 202A and 203B and sent to the portable terminal unit 202 through the paths P2 and P3 are delayed from the radio wave that is directly sent from the base station 201 to the portable terminal unit 202 through the path P1. Thus, as shown in FIG. 2, signals S1, S2, and S3 reach the portable terminal unit 202 through the paths P1, P2, and P3 at different timings, respectively. When the signals S1, S2, and S3 through the paths 21, 22, and P3 interfere with each other, a fading takes place. In the FDMA system and the TDMA system, the multi-paths cause the signal to be affected by the fading.

On the other hand, in the CDMA system, with diversity RAKE method, the fading due to the multi-paths can be alleviated and the S/N ratio can be improved.

In the diversity RAKE system, as shown in FIG. 3, receivers 221A, 221B, and 221C that receive signals S1, S2, and S3 through the paths P1, P2, and P3 are disposed, respectively. A timing detector 222 detects codes received through the individual paths. The codes are set to the receivers 221A, 221B, 221C corresponding to the paths P1, P2, and P3, respectively. The receivers 221A, 221B, and 221C demodulate the signals received through the paths P1, P2, and P3. The received output signals of the receivers 221A, 221B, and 221C are combined by a combining circuit 223.

In the spectrum spread system, signals received through different paths are prevented from interfering with each other. The signals received through the paths P1, P2, and P3 are separately demodulated. When the demodulated output signals received through the respective paths are combined, the signal intensity becomes large and the S/N ratio improves. In addition, the influence of the fading due to the multi-paths can be alleviated.

In the above-described example, for simplicity, with the three receivers 221A, 221B, and 221C and the timing detector 222, the structure of the diversity RAKE system was shown. However, in reality, in a cellular telephone terminal unit of diversity RAKE type, as shown in FIG. 4, fingers 251A, 251B, and 251C, a searcher 251, and a data combiner 253 are disposed. The fingers 251A, 251B, and 251C obtain demodulated output signals for the respective paths. The searcher 252 detects signals through multi-paths. The combiner 253 combines the demodulated data for the respective paths.

In FIG. 4, a received signal as a spectrum spread signal that has been converted into an intermediate frequency is supplied to an input terminal 250. This signal is supplied to a sub-synchronous detecting circuit 255. The sub-synchronous detecting circuit 255 is composed of a multiplying circuit. The sub-synchronous detecting circuit 255 multiplies a signal received from the input terminal 250 by an output signal of a PLL synthesizer 256. An output signal of the PLL synthesizer 256 is controlled with an output signal of a frequency combiner 257. The sub-synchronous detecting circuit 255 performs a quadrature detection for the received signal.

An output signal of the sub-synchronous detecting circuit 255 is supplied to an A/D converter 258. An output signal of the A/D converter 258 is supplied to the fingers 251A, 251B, and 251C. In addition, the output signal of the A/D conventer 258 is supplied to the searcher 252. The fingers 251A, 251B, and 251C de-spread the signals received through the respective paths, synchronize the signals, acquire the synchronization of the received signals, demodulate the data of these signals, and detect frequency errors of the signals.

The searcher 252 acquires the codes of the received signals and designates the codes of the paths to the fingers 251A, 251B, and 251C. In other words, the searcher 252 has a de-spreading circuit that multiplies a received signal by a PN code and de-spreads the signal. In addition, the searcher 252 shifts the phase of the PN code and obtains the correlation with the received code under the control of the controller 254. With the correlation between a designated code and a received code, a code for each path is determined.

An output signal of the searcher 252 is supplied to the controller 254. The controller 254 designates the phases of the PN codes for the fingers 251A, 251B, and 251C corresponding to the output signal of the searcher 252. The fingers 251A, 251B, and 251C de-spread the received signals and demodulate the received signals received through the respective phases corresponding to the designated phases of the PN codes.

The demodulated data is supplied from the fingers 251A, 251B, and 251C to the data combiner 253. The data combiner 253 combines the received signals received through the respective paths. The combined signal is obtained from an output terminal 259.

The fingers 251A, 251B, and 251C also detect frequency errors. The frequency errors are supplied to the frequency combiner 257. With an output signal of the frequency combiner 257, the oscillation frequency of the PLL synthesizer 256 is controlled.

Thus, in the RAKE system, signals received through a plurality of paths are demodulated by the fingers 251A, 251B, 251C and the resultant signals are combined by the combiner 253.

When the demodulated output signals received through a plurality of paths are combined, the timings of these paths should be matched. In other words, since the fingers 251A, 251B, and 251C demodulate signals received through different paths, timings of which the demodulated signals are output from the fingers 251A, 251B, and 251C are different from each other. Thus, the data combiner 253 should combine the demodulated signals in such a manner that the timings of the demodulated output signals of the fingers 251A, 251B, and 251C are matched.

To solve this problem, in the conventional system, the demodulated signals are delayed until all demodulated signals through the respective paths are obtained. When all the demodulated signals through all the paths are obtained, the demodulated signals are combined.

However, in this system, demodulated signals are not combined until the demodulated signal through the latest or slowest path is obtained.

OBJECTS AND SUMMARY OF THE INVENTION

An object of the present invention is to provide a receiving apparatus that allows a combiner to combine output signals of individual fingers with the minimum delay, a receiving method thereof, and a terminal unit for use with a portable telephone system thereof.

The present invention is a demodulating apparatus for demodulating signals with different phases and the same wave forms, comprising a plurality of demodulating of means for starting demodulating the signals at predetermined timings, timing monitoring means for determining the predetermined timings, a plurality of delaying means for receiving output signals of the plurality of demodulating means, and combining means for combining output signals of the plurality of delaying means, wherein the plurality of delaying means causes a delay amount corresponding to the start timing of demodulating means of which the predetermined timing is the maximum to become almost zero.

The present invention is a demodulating apparatus for demodulating a signal that has been spectrum-spread, comprising a plurality of de-spreading means for starting de-spreading of the signals at predetermined timings, timing monitoring means for determining the predetermined timings, a plurality of delaying means for receiving output signals of the plurality of de-spreading means, and combining means for combining output signals of the plurality of delaying means, wherein the plurality of delaying means causes a delay amount corresponding to the de-spread start timing of de-spreading means of which the predetermined timing is the maximum to become almost zero.

The present invention is a receiving apparatus for demodulating one received signal to a plurality of signals with different phases and same waveform, comprising receiving means for converting the received signal into a low frequency signal, a plurality of demodulating means for starting demodulating of an output signal of the receiving means at predetermined timings, timing monitoring means for determining the predetermined timings, a plurality of delaying means for receiving output signals of the plurality of demodulating means, and combining means for combining output signals of the plurality of delaying means, wherein the plurality of delaying means causes a delay amount corresponding to the start timing of demodulating means of which the predetermined timing is the maximum to become almost zero.

The present invention is a receiving apparatus for demodulating a signal that has been spectrum-spread, comprising receiving means for converting the received signal into a low frequency signal, a plurality of de-spreading means for starting de-spreading of an output signal of the receiving means at predetermined timings, timing monitoring means for determining the predetermined timings, a plurality of delaying means for receiving output signals of the plurality of de-spreading means, and combining means for combining output signals of the plurality of delaying means, wherein the plurality of delaying means causes a delay amount corresponding to the de-spread start timing of de-spreading means of which the predetermined timing is the maximum to become almost zero.

The present invention is a communication apparatus for modulating an information signal, transmitting a high frequency signal, and demodulating one received signal to a plurality of signals with different phases and same waveform, comprising transmitting means for modulating an information signal, generating a high frequency signal, and transmitting the high frequency signal, receiving means for converting a received signal into a low frequency signal, a plurality of demodulating means for receiving an output signal of the receiving means and starting demodulating of the received signal at predetermined timings, timing monitoring means for determining the predetermined timings, a plurality of delaying means for receiving output signals of the plurality of demodulating means, and combining means for combining output signals of the plurality of delaying means, wherein the plurality of delaying means causes the delay amount corresponding to the start timing of demodulating means of which the predetermined timing is the maximum to become almost zero.

The present invention is a communication apparatus for modulating an information signal corresponding to spectrum spread system, converting the resultant signal into a high frequency signal, and transmitting the high frequency signal and for receiving a signal that has been spectrum-spread, comprising transmitting means for modulating an information signal corresponding to spectrum spreading system, generating a high frequency signal, and transmitting the resultant signal, receiving means for converting a received signal into a low frequency signal, a plurality of de-spreading means for receiving an output signal of the receiving means and starting de-spreading of the received signal at predetermined timings, timing monitoring means for determining the predetermined timings, a plurality of delaying means for receiving output signals of the plurality of de-spreading means, and combining means for combining output signals of the plurality of delaying means, wherein the plurality of delaying means causes a delay amount corresponding to the de-spread start timing of de-spreading means of which the predetermined timing is the maximum to become almost zero.

According to the present invention, when demodulated signals through respective paths are combined by the data combiner, the count values of the PN phase counters that represent the phases of the PN codes are stored as write addresses to the memories. With the common read address, signals are read from the memories. Thus, demodulated signals through respective paths can be combined with the minimum delay of the demodulated signals through the respective paths.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
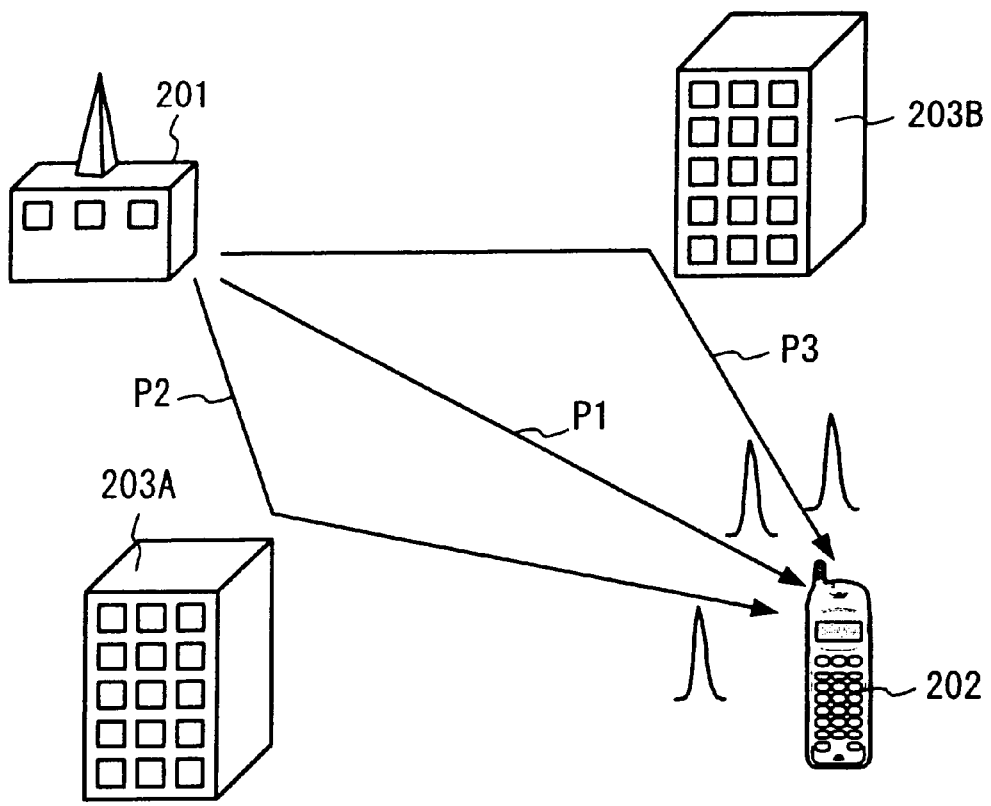
FIG. 1 is a schematic diagram for explaining multi-paths.
Figure 2:
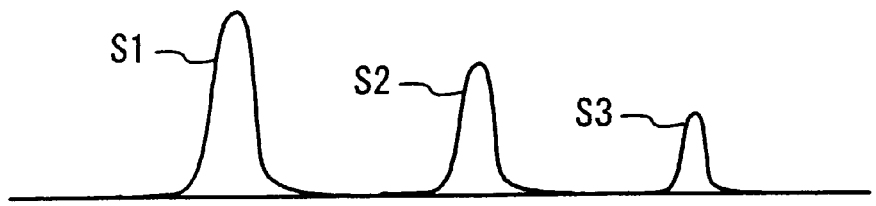
FIG. 2 is a schematic diagram showing waveforms for explaining the multi-paths.
Figure 3:
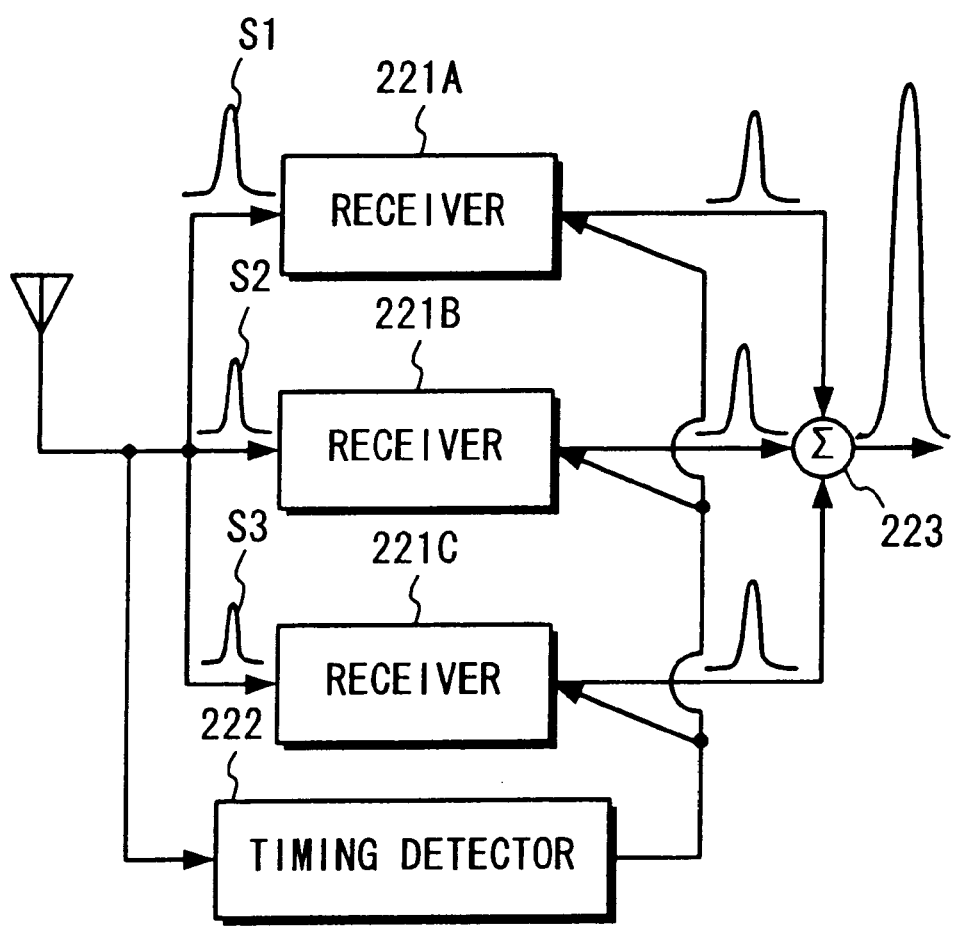
FIG. 3 is a block diagram for explaining a diversity RAKE system.
Figure 4:
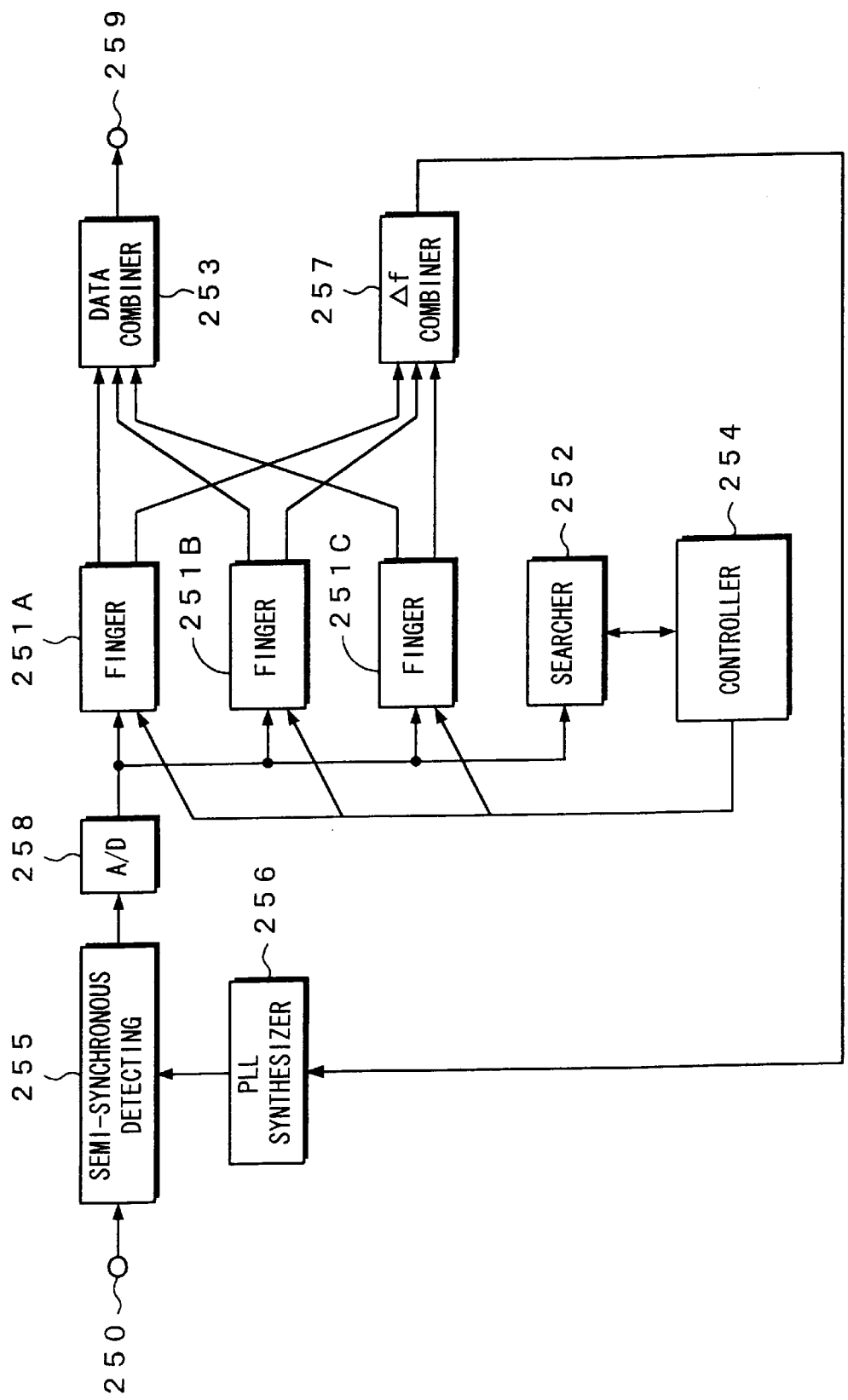
FIG. 4 is a block diagram showing an example of a receiver of the diversity RAKE system.
Figure 5:
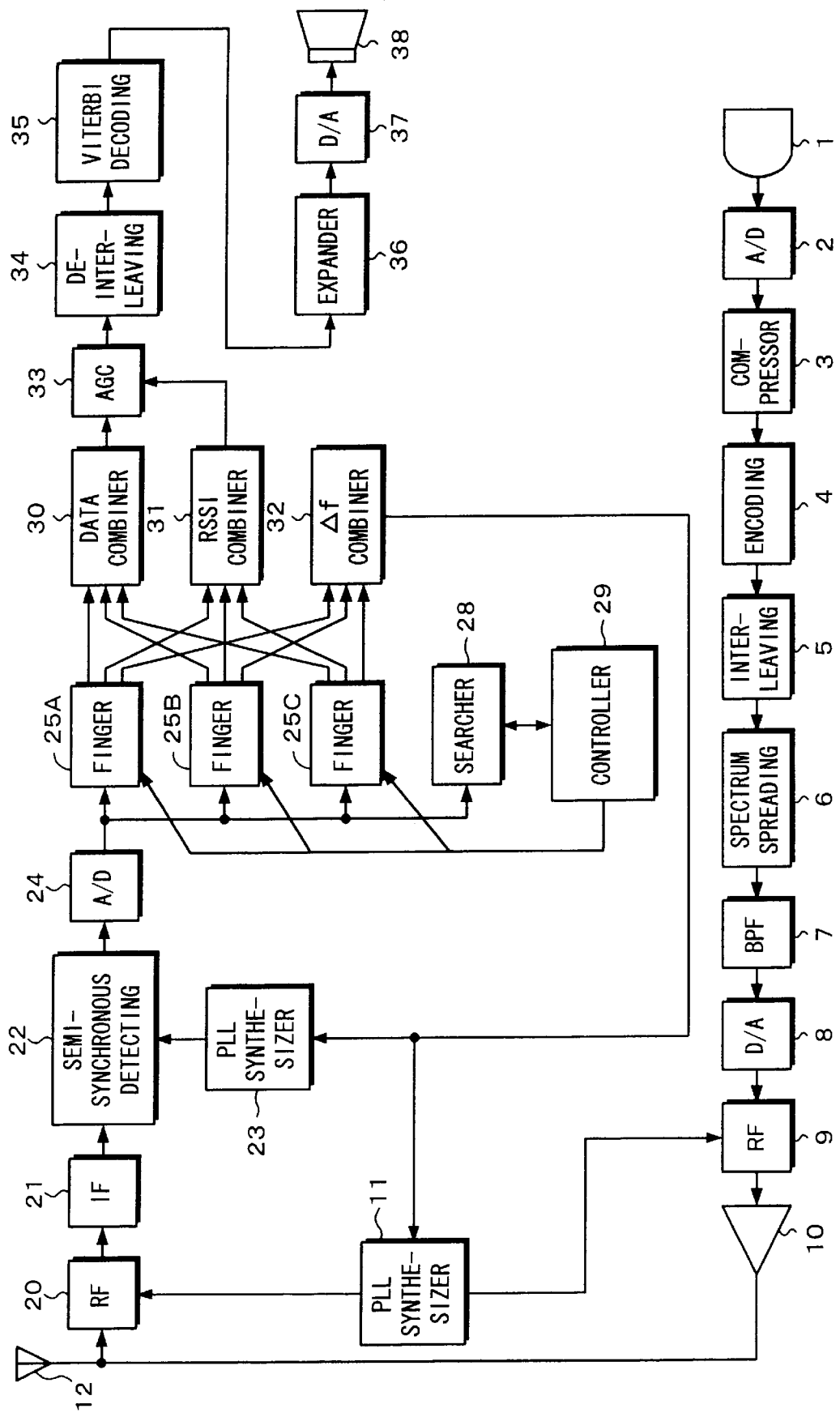
FIG. 5 is a block diagram showing the overall structure of a portable telephone terminal unit of CDMA type according to the present invention.

With reference to the accompanying drawings, an embodiment of the present invention will be described. FIG. 5 is a block diagram showing an example of a portable terminal unit for use with a cellular telephone system of CDMA type according to the present invention. The portable terminal unit uses diversity RAKE system as the receiving system. In the diversity RAKE system, signals are received from a plurality of paths at roughly the same time. The received signals are combined.

In FIG. 5, in the transmission mode, an audio signal is input through a microphone 1. The audio signal is supplied to an A/D converter 2. The A/D converter 2 converts an analog audio signal into a digital audio signal. An output signal of the A/D converter 2 is supplied to a audio compressing circuit 3.

The audio compressing circuit 3 compresses and encodes the digital audio signal. As examples of the compressing and encoding system, various types have been proposed. For example, a system such as QCELP (Qualcomm Code Excited Linear Prediction) system can be used. In the QCELP system, depending on the characteristics of the sound of the user and the congestion state of the communication path, a plurality of encoding speeds can be used. In this case, four encoding speeds (9.6 kbps, 4.8 kbps, 2.4 kbps, and 1.2 kbps) can be selected. To maintain the communication quality, data can be encoded at the minimum speed. It should be noted that the audio compressing system is not limited to the QCELP system.

An output signal of the audio compressing circuit 3 is supplied to a convolutional encoding circuit 4. The convolutional encoding circuit 4 adds an error correction code as a convolutional code to the transmission data. An output signal of the convolutional encoding circuit 4 is supplied to an interleaving circuit 5. The interleaving circuit 5 interleaves the transmission data. An output signal of the interleaving circuit 5 is supplied to a spectrum spreading circuit 6.

The spectrum spreading circuit 6 primarily modulates the carrier and spreads the resultant signal with a PN code. In other words, the spectrum spreading circuit 6 primarily modulates the transmission data corresponding to, for example, the balanced QPSK modulating method. In addition, the resultant signal is multiplied by a PN code. Since the PN code is a random code, when the PN code is multiplied, the frequency band of the carrier is widened. Thus, the carrier is spectrum-spread. As an example of the modulating method for the transmission data, the balanced QPSK modulating method is used. However, another modulating method can be used in various methods that have been proposed.

An output signal of the spectrum spreading circuit 6 is supplied to a D/A converter 8 through a band pass filter 7. An output signal of the D/A converter 8 is supplied to an RF circuit 9.

A local oscillation signal is supplied from a PLL synthesizer 11 to the RF circuit 9. The RF circuit 9 multiplies the output signal of the D/A converter 8 by the local oscillation signal of the PLL synthesizer 11 and thereby converts the frequency of the transmission signal into a predetermined frequency. An output signal of the RF circuit 9 is supplied to transmission amplifier 10. After the power of the transmission signal is amplified, the resultant signal is supplied to an antenna 12. A radio wave is sent from the antenna 12 to a base station.

In the reception mode, a radio wave sent from a base station is received by the antenna 12. Since the radio wave sent from the base station is reflected by buildings and so forth, the radio wave reaches the antenna 12 of the portable terminal unit through multi-paths. When the portable terminal unit is used in a car or the like, the frequency of the received signal may vary due to the Doppler effect.

The output signal of the antenna 12 is supplied to an RF circuit 20. The RF circuit 20 receives a local oscillation signal from the PLL synthesizer 11. The RF circuit 20 converts the received signal into an intermediate frequency signal with a predetermined frequency.

An output signal of the RF circuit 20 is supplied to a semi-synchronous detecting circuit 22 through an intermediate frequency circuit 21. An output signal of a PLL synthesizer 23 is supplied to the semi-synchronous detecting circuit 22. The frequency of the output signal of the PLL synthesizer 23 is controlled with an output signal of a frequency combiner 32. The semi-synchronous detecting circuit 22 quadrature-detects the received signal.

An output signal of the semi-synchronous detecting circuit 22 is supplied to an A/D converter 24. The A/D converter 24 digitizes the output signal of the semi-synchronous detecting circuit 22. At this point, the sampling frequency of the A/D converter 24 is higher than the frequency of the PN code that has been spectrum-spread. In other words, the input signal of the A/D converter is over-sampled. An output signal of the A/D converter 24 is supplied to fingers 25A, 25B, and 25C. In addition, the output signal of the A/D converter 24 is supplied to a searcher 28.

As described above, in the reception mode, signals are received through multi-paths. The fingers 25A, 25B, and 25C multiply the signals received through the multi-paths by the PN code so as to de-spread the received signals. In addition, the fingers 25A, 25B, and 25C output the levels of the signals received through the multi-paths and the frequency errors of these multi-paths.

The searcher 28 acquires the codes of the received signals and designates the codes for the paths. In other words, the searcher 28 has a de-spreading circuit that multiplies the received signals by the respective PN codes and de-spread the received signals. The searcher 28 shifts the phases of the PN codes under the control of a controller 29 and obtains the correlation with the received codes. With the correlation values of the designated codes and the received codes, the codes for the respective paths are designated. The codes designated by the controller 29 are supplied to the fingers 25A, 25B, and 25C.

The received data for the respective paths demodulated by the fingers 25A, 25B, and 25C is supplied to a data combiner 30. The data combiner 30 combines the received data for the respective paths. An output signal of the data combiner 30 is supplied to an AGC circuit 33.

The fingers 25A, 25B, and 25C obtain the intensities of the signals received through the respective paths. The intensities of the signals received through the respective path are supplied from the fingers 25A, 25B, and 25C to a RSSI combiner 31. The RSSI combiner 31 combines the intensities of the signals received through the respective paths. An output signal of the RSSI combiner 31 is supplied to the AGC circuit 33. The gain of the AGC circuit 33 is controlled so that the signal level of the received data becomes constant.

The frequency errors for the respective paths are supplied from the fingers 25A, 25B, and 25C to the frequency combiner 32. The frequency combiner 32 combines the frequency errors for the respective paths. An output signal of the frequency combiner 32 is supplied to the PLL synthesizer 11 and 23. Corresponding to the resultant frequency error, the frequencies of the PLL synthesizer 11 and 23 are controlled.

The output signal of the AGC circuit 33 is supplied to a de-interleaving circuit 34. The de-interleaving circuit 34 de-interleaves the received data that has been interleaved on the transmission side. An output signal of the de-interleaving circuit 34 is supplied to a Viterbi decoding circuit 35. The Viterbi decoding circuit 35 decodes a convolutional code with a soft determining process and a maximum likelihood decoding process. The Viterbi decoding circuit 35 performs an error correcting process. An output signal of the Viterbi decoding circuit 35 is supplied to an audio expanding circuit 36.

The audio expanding circuit 36 decompresses the audio signal that has been compressed with for example the QCELP method and decodes a digital audio signal. The digital audio signal is supplied to a D/A converter 37. The D/A converter 37 restores a digital audio signal to an analog audio signal. The analog audio signal is supplied to a speaker 38.

As described above, the present invention is applied for a portable terminal unit for use with a cellular telephone system of CDMA type of which demodulated data of the fingers 25A, 25B, and 25C are combined by the data combiner 30.

Figure 6:
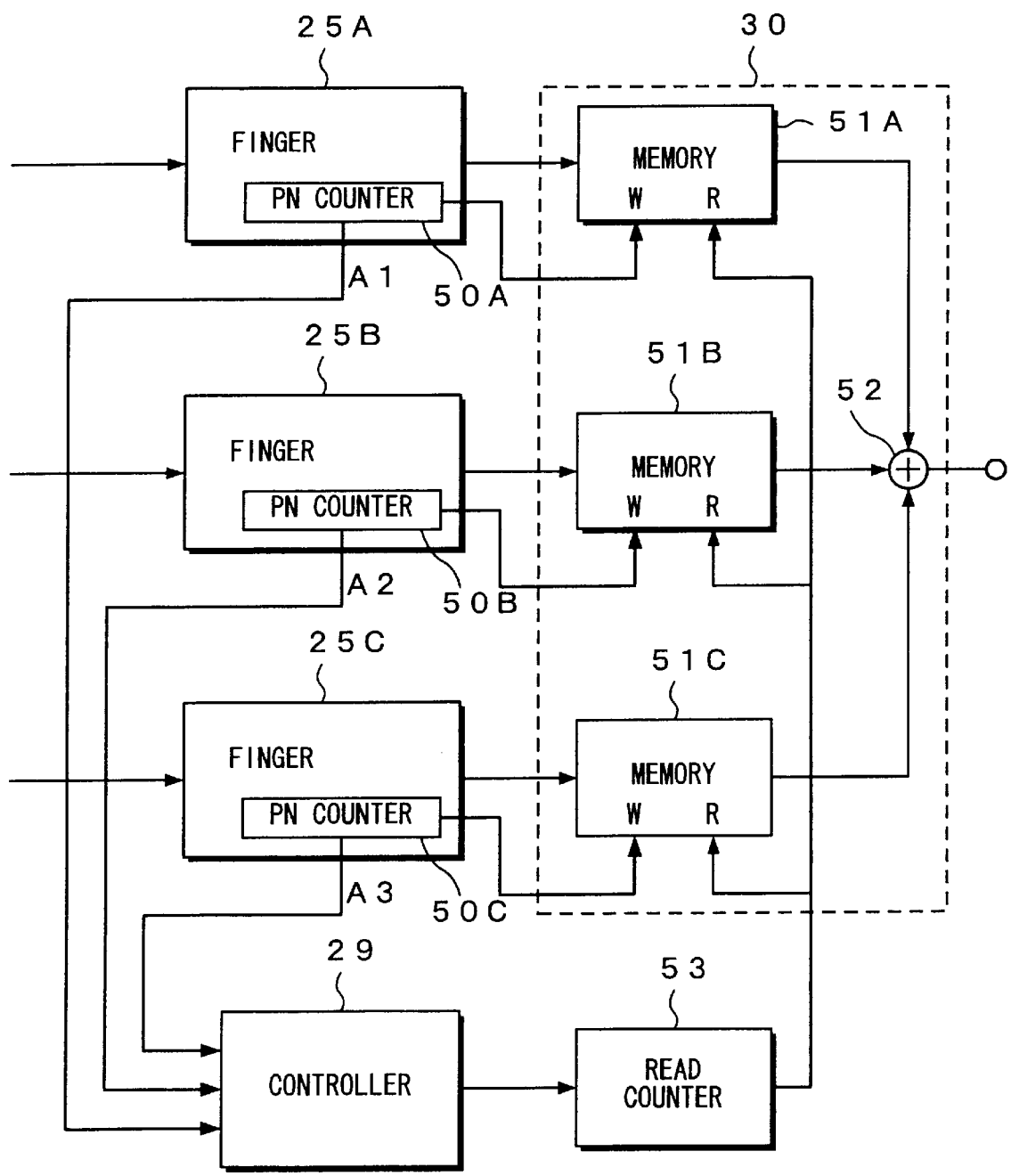
FIG. 6 is a block diagram showing an example of the structure of a combiner of the portable telephone terminal unit of CDMA type according to the present invention.

In other words, in FIG. 6, demodulated signals that are output from the fingers 25A, 25B, and 25C are supplied to memories 51A, 51B, and 51C, respectively. PN phase count values received from PN phase counters 50A, 50B, and 50C of the fingers 25A, 25B, and 25C are supplied as write addresses to the memories 51A, 51B, and 51C, respectively. In addition, the PN phase count values of the PN phase counters 50A, 50B, and 50C of the fingers 25A, 25B, and 25C are supplied to the controller 29.

The controller 29 generates a load signal. The load signal is supplied to a read counter 53. The read counter 53 generates a read address corresponding to the load signal. The read address is supplied to the memories 51A, 51B, and 51C.

As described above, initial phases searched by the searcher 28 are designated to the fingers 25A, 25B, and 25C. The fingers 25A, 25B, and 25C have respective DLL circuits. The fingers 25A, 25B, and 25C track synchronization of respective phases. Thus, the count values of the PN phase counters 50A, 50B, and 50C of the fingers 25A, 25B, and 25C accord with the phases of codes received through the respective paths.

Consequently, the output timings of the demodulated signals of the fingers 25A, 25B, and 25C accord with the count values of the PN phase counters 50A, 50B, and 50C of the fingers 25A, 25B, and 25C, respectively. Thus, the count values of the PN phase counters 50A, 50B, and 50C that represent the phases of PN codes of the fingers 25A, 25B, and 25C are supplied as write addresses to the memories 51A, 51B, and 51C, respectively. When the demodulated signals that are output from the fingers 25A, 25B, and 25C are stored in the memories 51A, 51B, and 51C, the demodulated signals are stored at the same addresses of the memories 51A, 51B, and 51C, respectively.

Figures 7A, 7B, 7C:
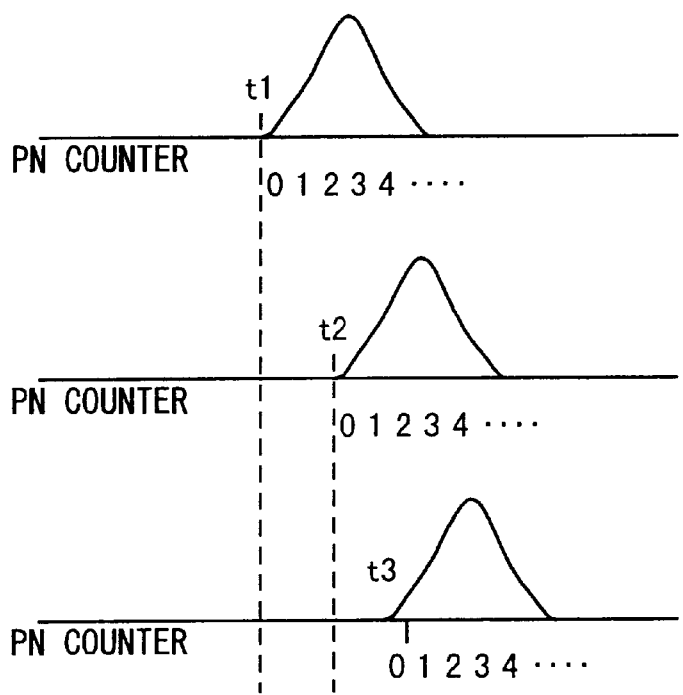
FIGS. 7A to 7C are schematic diagrams for explaining a combiner of the portable telephone terminal unit of CDMA type according to the present invention.

In other words, as shown in FIGS. 7A, 7B, and 7C, assume that the fingers 25A, 25B, and 25C output demodulated signals through respective paths at times $t_1$, $t_2$, and $t_3$, respectively. Since the fingers 25A, 25B, and 25C demodulate signals received through different paths, the times $t_1$, $t_2$, and $t_3$ at which the demodulated signals are output from the fingers 25A, 25B, and 25C are different from each other. As described above, since the phases of the PN codes designated to the fingers 25A, 25B, and 25C accord with the phases of the codes received through the respective paths, when the demodulated signals of the fingers 25A, 25B, and 25C are obtained, the count values of the PN phase counters that represent the phases of the PN codes of the fingers 25A, 25B, and 25C are the same. Thus, when the demodulated signals that are output from the fingers 25A, 25B, and 25C are stored to the memories 51A, 51B, and 51C with write addresses that are the count values of the PN phase counters 50A, 50B, and 50C that represent the phases of the PN codes of the fingers 25A, 25B, and 25C, the demodulated signals through the respective paths are stored at the same addresses of the memories 51A, 51B, and 51C.

In FIG. 6, the read counter 53 supplies a common read address to the memories 51A, 51B, and 51C. The memories 51A, 51B, and 51C store respective demodulated signals at the same addresses thereof. When the common read address is supplied to the memories 51A, 51B, and 51C, demodulated signals corresponding to the respective paths are read from the memories 51A, 51B, and 51C, respectively. The demodulated signals are supplied to an adding circuit 52. The adding circuit 52 adds and combines the demodulated signals.

Figure 8:
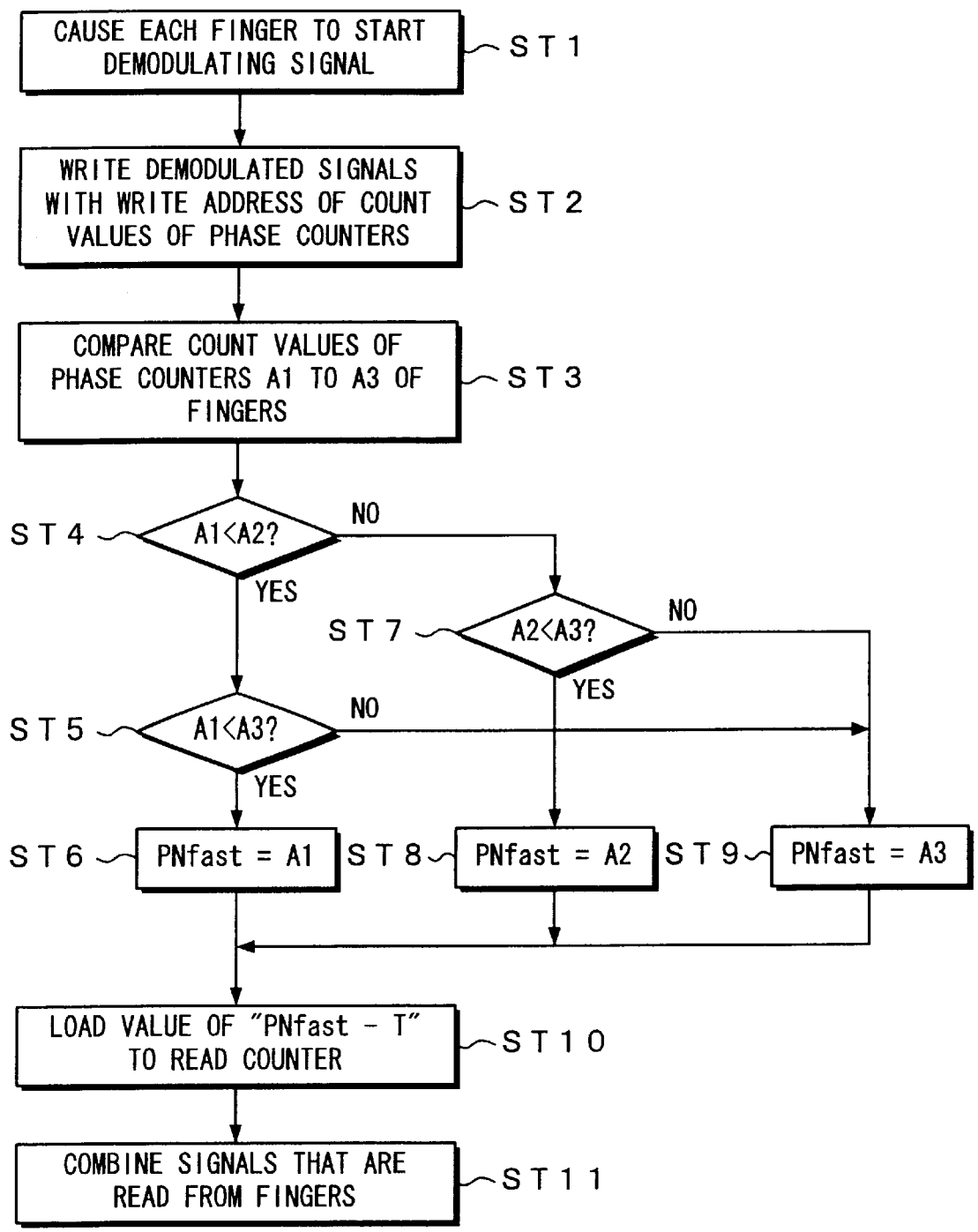
FIG. 8 is a flow chart for explaining the combiner of the portable telephone terminal unit of CDMA type according to the present invention.

FIG. 8 is a flow chart showing the above-described process. Referring to FIG. 8, when the fingers 25A, 25B, and 25C start demodulating data (at step ST1), the demodulated signals are written to the memories 51A, 51B, and 51C with write addresses that are the count values of the PN phase counters 50A, 50B, and 50C of the fingers 25A, 25B, and 25C (at step ST2). Assuming that the count values of the PN phase counters 50A, 50B, and 50C of the fingers 25A, 25B, and 25C are denoted by A1, A2, and A3, respectively, the count values A1, A2, and A3 of the PN phase counters 50A, 50B, and 50C are compared (at step ST3).

It is determined whether or not the count value A1 is smaller than the count value A2 (at step ST4). When the count value A1 is smaller than the count value A2, it is determined whether or not the count value A1 is smaller than the count value A3 (at step ST5). When the count value A1 is smaller than the count value A3, it is determined that the PN phase counter 50A of the finger 25A is the fastest. The count value A1 is designated to a variable PNfast that represents the fastest phase (at step ST6).

When the count value A1 is not smaller than the count value A2 as the determined result at step ST4, it is determined whether or not the count value A2 is smaller than the count value A3 (at step ST7). When the count value A2 is smaller than the count value A3, it is determined that the PN phase counter 50B of the finger 25B is the fastest. The count value A2 is designated to the variable PNfast that represents the fastest phase (at step ST8).

When the count value A1 is not smaller than the count value A3 as the determined result at step ST5 and when the count value A2 is not smaller than the count value A3 as the determined result at step ST7, it is determined that the PN phase counter 50C of the finger 25C is the fastest. The count value A3 is designated to the variable PNfast that represents the fastest phase (at step ST9).

When the value of the variable PNfast that represents the fastest phase has been designated, a value of which a predetermined value is subtracted from the variable PNfast (PNfast−T) is loaded to the read counter 53 (at step ST10).

The demodulated signals are read at the address represented by the read counter 53 from the fingers 25A, 25B, and 25C. The demodulated signals that have been read from the fingers 25A, 25B, and 25C are combined by the adding circuit 52 (at step ST11).

As described above, in the portable terminal unit for use with the cellular telephone system of CDMA type according to the present invention, when demodulated signals through respective paths are combined by the data combiner 30, with the count values of the PN phase counters that represent the phases of the PN codes as write addresses, the demodulated signals that are output from the fingers 25A, 25B, and 25C are stored in the memories 51A, 51B, and 51C, respectively. The demodulated signals are read from the memories 51A, 51B, and 51C with the common read address. Thus, the demodulated signals through respective paths can be combined without a delay.

In the above-described example, demodulated signals that are output from the fingers 25A, 25B, and 25C through three paths are combined. However, it should be noted that the number of paths is not limited to three. In addition, in the structure shown in FIG. 6, the write timings of signals written to the memories are different and the read timings of the signals that are read from the memories are the same. However, it is easy to provide a structure of which the write timings are the same and the read timings are different.

According to the present invention, when demodulated signals through respective paths are combined by the data combiner, the count values of the PN phase counters that represent the phases of the PN codes are stored as write addresses to the memories. With the common read address, signals are read from the memories. Thus, demodulated signals through respective paths can be combined with the minimum delay of the demodulated signals through the respective paths.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A demodulating method for demodulating a plurality of signals with different phases and same waveforms, comprising the steps of:

(a) demodulating the plurality of signals at predetermined timings;

(b) determining the predetermined timings and monitoring the predetermined timings;

(c) controlling respective timings of demodulated output signals demodulated at the step of demodulating by controlling one of read timings and write timings of the demodulated output signals in respective memories; and (d) combining timing controlled output signals controlled at the step of controlling, wherein the controlling of the timing at the step of controlling is based on a determination of a fastest phase of the demodulated output signals.

2. A receiving method corresponding to both a CDMA system and a RAKE system, comprising the steps of:

(a) converting a received signal into a low frequency signal;

(b) starting CDMA-demodulating of a plurality of low frequency signals from said step of converting at respective timings;

(c) determining the respective timings;

(d) controlling respective timings of demodulated output signals CDMA-demodulated at the step of starting; and (e) combining output signals controlled at the step of controlling, wherein controlling of the timings at the step of controlling is based on a fastest phase of the respective timings determined in the step of determining.

3. A demodulating apparatus for demodulating a plurality of signals with different phases and same waveforms, comprising:

demodulating means for starting demodulating of the plurality of signals at respective timings;

timing monitoring means for determining the respective timings of the plurality of signals;

timing varying means for varying respective timings of a plurality of demodulated output signals of said demodulating means by controlling one of read timings and write timings of the plurality of demodulated output signals in respective memories; and combining means for combining a plurality of output signals of said timing varying means, wherein said timing varying means varies the timings of the plurality of respective demodulated signals based on a phase of the respective timings determined by the timing monitoring means.

4. The demodulating apparatus as set forth in claim 3, wherein said timing monitoring means monitors output signals of phase detected portions of the plurality of signals to be demodulated by said demodulating means.

5. A demodulating apparatus for demodulating a signal that has been spectrum-spread, comprising:

de-spreading means for starting de-spreading of a plurality of signals at respective timings;

timing monitoring means for determining the respective timings of the plurality of signals;

timing varying means for varying respective timings of a plurality of de-spread output signals of said de-spreading means by controlling one of read timings and write timings of the plurality of de-spread output signals in respective memories; and combining means for combining a plurality of output signals of said timing varying means, wherein said timing varying means varies the timing of the plurality of respective de-spread signals based on a fastest phase of the respective timings determined by the timing monitoring means.

6. The demodulating apparatus as set forth in claim 5, wherein said timing monitoring means monitors output signals of phase detected portions of de-spread PN codes of said de-spreading means.

7. A receiving apparatus for demodulating one received signal to a plurality of signals with different phases and same waveforms, comprising:

receiving means for converting the received signal into a low frequency signal;

demodulating means for starting demodulating of a plurality of low frequency output signals of said receiving means at respective timings;

timing monitoring means for determining the respective timings;

timing varying means for varying respective timings of a plurality of demodulated output signals of said demodulating means by controlling one of read timings and write timings of the plurality of demodulated output signals in respective memories; and combining means for combining a plurality of output signals of said timing varying means, wherein said timing varying means varies the timings of the plurality of demodulated signals based on a fastest phase of the respective timings determined by the timing monitoring means.

8. The receiving apparatus as set forth in claim 7, wherein said timing monitoring means monitors output signals of phase detected portions of the plurality of signals to be demodulated by said demodulating means.

9. A receiving apparatus for demodulating a signal that has been spectrum-spread, comprising:

receiving means for converting the received signal into a low frequency signal;

de-spreading means for starting de-spreading of output signals of said receiving means at respective timings;

timing monitoring means for determining the respective timings;

timing varying means for varying respective timings of a plurality of de-spread output signals of said de-spreading means by controlling one read timings and write timings of the plurality of de-spread output signals in respective memories; and combining means for combining a plurality of output signals of said timing varying means, wherein said timing varying means varies the timings of the plurality of respective de-spread signals based on a fastest phase of the respective timings determined by the timing monitoring means.

10. The receiving apparatus as set forth in claim 9, wherein said timing monitoring means monitors output signals of phase detected portions of de-spread PN codes of said de-spreading means.

11. A communication apparatus for modulating an information signal, transmitting a high frequency signal, and demodulating a received signal to a plurality of signals with different phases and same waveforms, comprising:

transmitting means for modulating the information signal, generating the high frequency signal, and transmitting the high frequency signal;

receiving means for converting the received signal into a low frequency signal;

demodulating means for receiving and starting demodulating of a plurality of low-frequency output signals of said receiving means at respective timings;

timing monitoring means for determining the respective timings of said plurality of low frequency output signals;

timing varying means for varying respective timings of a plurality of demodulated output signals of said demodulating means by controlling one of read timings and write timings of the plurality of demodulated output signals in respective memories; and combining means for combining a plurality of output signals of said timing varying means, wherein said timing varying means varies the timings of the plurality of demodulated signals based on a fastest phase of the respective timings determined by the timing monitoring means.

12. The communication apparatus as set forth in claim 11, wherein said timing monitoring means monitors output signals of phase detected portions of the plurality of signals to be demodulated by said demodulating means.

13. A communication apparatus for modulating an information signal corresponding to a spectrum spread system, converting a resultant signal into a high frequency signal, and transmitting the high frequency signal, and for receiving a signal that has been spectrum-spread, comprising:

transmitting means for modulating the information signal corresponding to the spectrum spreading system, generating the high frequency signal, and transmitting the resultant signal;

receiving means for converting the received signal into a low frequency signal;

a plurality of de-spreading means for receiving and starting de-spreading of a respective plurality of low frequency output signals of said receiving means at respective timings;

timing monitoring means for determining the respective timings of the plurality of low frequency output signals;

timing varying means for varying the timings of a plurality of de-spread output signals of said de-spreading means by controlling one of read timings and write timings of the plurality of de-spread output signals in respective memories; and combining means for combining a plurality of output signals of said timing varying means, wherein said timing varying means varies the timings of the plurality of respective de-spread signals based on a fastest phase of the respective timings determined by the timing monitoring means.

14. The communication apparatus as set forth in claim 13, wherein said timing monitoring means monitors output signals of phase detected portions of de-spread PN codes of said de-spreading means.

* * * * *